Feb. 13, 1951     A. H. McGREGOR     2,541,265
HEAT CONCENTRATOR FOR USE WITH COOKING UTENSILS
Filed Oct. 19, 1949     2 Sheets-Sheet 1
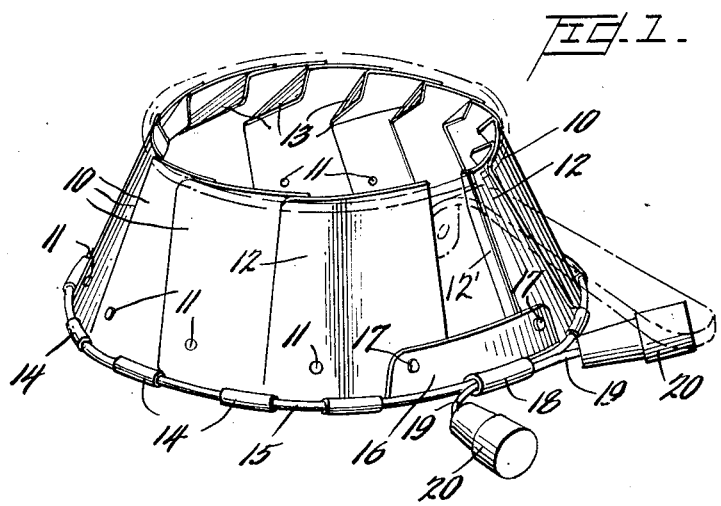
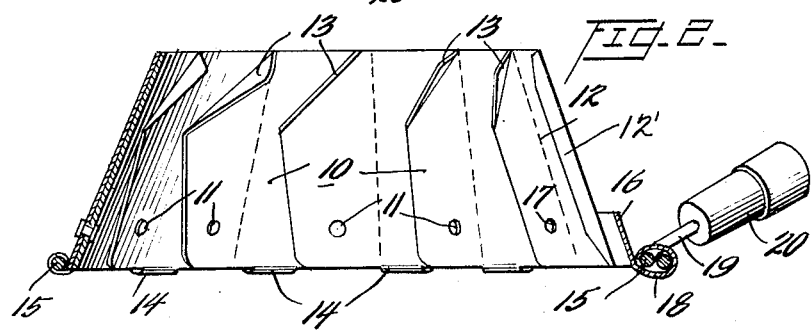
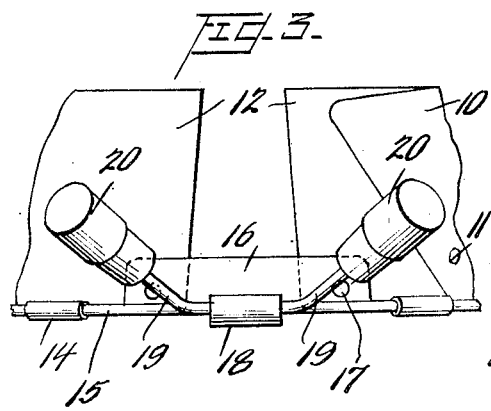
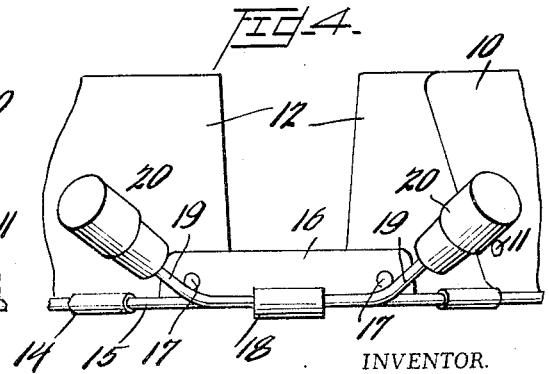
INVENTOR.
A. H. McGregor
BY
Watson, Cole, Grindle & Watson
ATTORNEYS.

Feb. 13, 1951 A. H. McGREGOR 2,541,265
HEAT CONCENTRATOR FOR USE WITH COOKING UTENSILS
Filed Oct. 19, 1949 2 Sheets-Sheet 2
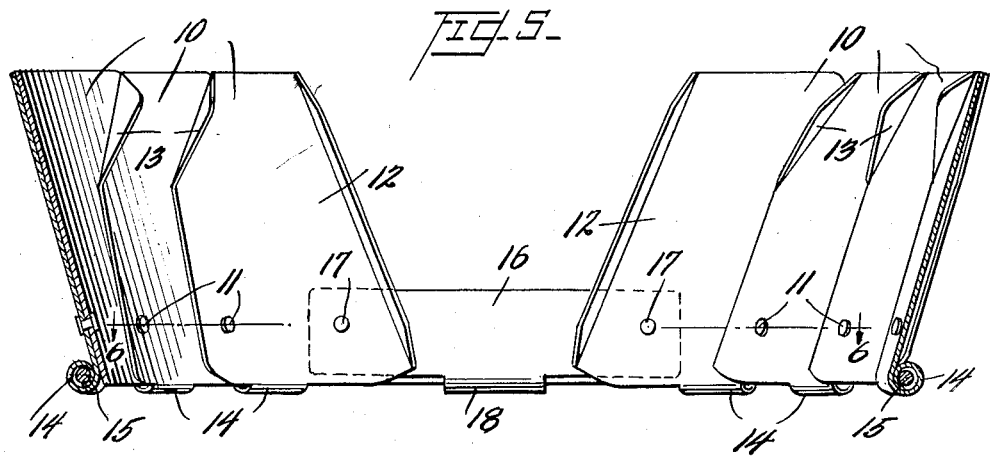
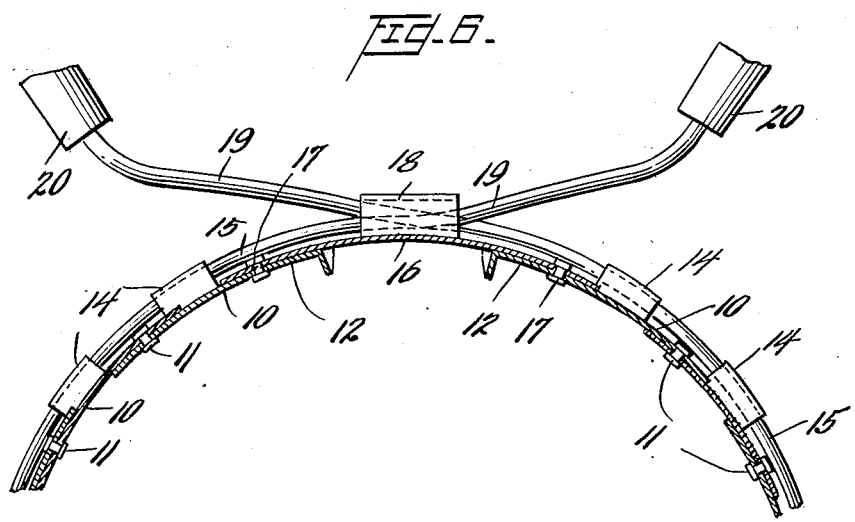
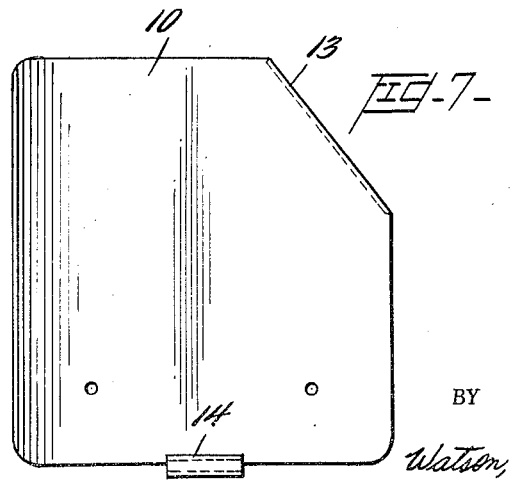
INVENTOR.
A. H. McGregor
BY
Watson, Cole, Grindle & Watson
ATTORNEYS Patented Feb. 13, 1951

2,541,265

UNITED STATES PATENT OFFICE 2,541,265

HEAT CONCENTRATOR FOR USE WITH COOKING UTENSILS

Angus H. McGregor, Miami, Fla.

Application October 19, 1949, Serial No. 122,191

5 Claims. (Cl. 126—215)

This invention relates to heat concentrators for use with cooking utensils, and more particularly to concentrators or deflectors having an expansible and contractible upper end, for use with cooking utensils of different diameters, the lower end of the concentrator being preferably of a diameter suited to the lids, burners, or other cooking elements of the stove or range with which it is to be used.

It is well known that cooking utensils, such as stew pots, saucepans and the like may be had in a variety of diameters, depending upon the capacity of the vessels, and that in very many cases the diameter of the bottom or heating surface of the utensil is not suited to the diameter of the burner or other heating element with which it is intended to be associated. In the case of small utensils, covering only a portion of the heating element, a considerable part of the heat developed by the heating element is wasted by passing upwardly beyond the walls of the utensil and serving only to raise the temperature of the room in which the cooking is being performed, which in itself is usually undesirable. In such cases there is a loss of efficiency which may be largely obviated by means of the present invention.

It is an object of the invention to provide a heat concentrator or deflector comprising a generally circular series of overlapping, generally vertically disposed plates, each said plate being pivotally connected to the next plate in the series intermediate its upper and lower edges, and preferably nearer the lower edge, together with means slidably connecting the lower edges of the plates of the said series, said means being expansible and contractible to bring about a pivotal movement of each plate relative to the next, whereby the upper edge of the series may be contracted or expanded, as the case may be, to accommodate cooking utensils of various diameters.

Another object is the provision of a heat deflecting apparatus of the character described, an upper corner of each of at least three of the said plates being bent inwardly to provide spacing ears, to prevent the plates from directly contacting or lying against the utensil. Another object is the provision of a heat deflector of the character described, the series of plates comprising almost, but not entirely, a complete circle, the end plates of the series being permanently separated by a space of sufficient width to receive the handle of a cooking utensil.

Another object is the provision of a heat deflecting apparatus such as described, the expanding and contracting means constituting a flexible member slidably secured to each of the plates adjacent its lower edge, the respective ends of the said member being bent outwardly to provide handles which may be grasped and moved toward or away from each other to expand or contract the device.

Other and further objects, features and advantages will be apparent from the description which follows, read in connection with the accompanying drawings in which:

Figure 1 is a perspective view of the invention, with a cooking utensil shown in broken lines;

Figure 2 is an axial section through the device of Figure 1;

Figure 3 is a fragmentary elevation of the device adjacent the adjusting handles;

Figure 4 is a view similar to Figure 3, but showing the device in a somewhat expanded position;

Figure 5 is a view similar to Figure 2, but taken at 90° angle thereto, showing the device in expanded position;

Figure 6 is a horizontal section on line 6—6 of Figure 5; and

Figure 7 is an elevation of a single plate or element of the series comprised in the invention.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

The device of the invention comprises, in its present embodiment, a circular series of generally vertically disposed plates 10 each of which overlaps the next plate in the series and is pivotally connected thereto, as by rivets 11, at a point intermediate the upper and lower edges thereof. The plates are parti-cylindrical in form and generally rectangular in outline whereby, when the device is adjusted so that the plates are substantially vertical, the series comprises substantially a cylinder. An upper corner of each of at least three of the plates, and preferably all of them except one of the end plates 12 of the series, is bent inwardly to form ears 13 so that the upper edges of the plates are spaced from the walls of a utensil with which the device is used, so as to permit the heated air to pass upwardly, while deflecting it to impinge against the utensil walls.

Each plate 10 is provided at or adjacent its lower edge with an externally disposed sleeve 14 which may be formed integrally with the plate, and which slidably receives a wire or other flexible member 15. The adjacent lower corners of the plates 10 are relieved to avoid interference with sleeves 14 during pivotal movement of the plates. The end plates 12 of the series preferably have their adjacent edges flanged inwardly as at 12' to avoid loss of heat around them, and for better appearance, and are permanently secured in spaced relationship by means of a rigid strap or plate 16 riveted or otherwise pivotally connected to each of the end plates 12 as at 17. The strap 16 is formed to provide, at its lower edge, a sleeve 18 similar to the sleeves 14 of the plates 10, but of somewhat larger internal diameter. The respective ends 19 of the wire or other member 15 overlap or cross in passing through the sleeve 18, their extremities being bent outwardly and, if desired, provided with heat insulating handles 20.

The operation of the device will be apparent from the foregoing description. When the handles 20 are grasped and forced apart, thus contracting the loop or circle described by the member 15, the lower ends of the plates 10 are forced toward each other, causing each plate to rock about a pivot point 11, which in turn causes the circular opening defined by the upper edges of the plates to be expanded. Forcing the handles 20 toward each other produces the opposite result. When the upper end of the device has been adjusted to an expanded diameter, a cooking utensil may be inserted therein, and the device then contracted so that the ears 13 just touch the outer wall of the utensil.

Figure 2 shows the device in contracted position to embrace a small utensil and Figure 5 illustrates the device in expanded position preparatory to the insertion of a utensil.

Having thus described the invention, what is claimed as new and desired to be secured by Letters Patent is:

1. A heat concentrator for use with cooking utensils comprising a circular series of generally vertically disposed parti-cylindrical plates each of which overlaps and is pivoted to the next plate in the series at a point between its upper and lower edges, said series comprising almost a complete circle, the respective end plates of said series being spaced apart to provide a gap of sufficient breadth to accommodate a utensil handle, means pivotally connected to and extending between said end plates and means slidably connecting the plates of said series below their respective pivot points, said last means being generally circular and being expansible and contractible to contract and expand the upper edge of said series.

2. A heat concentrator for use with cooking utensils comprising a circular series of generally vertically disposed parti-cylindrical plates each of which overlaps and is pivoted to the next plate in the series at a point between its upper and lower edges, and means slidably connecting the plates of said series below their respective pivot points, said last means being generally circular and being expansible and contractible to contract and expand the upper edge of said series.

3. The device of claim 2, said last means comprising a flexible member slidably secured to each of said plates adjacent its lower edge.

4. The device of claim 3, the respective ends of said member being bent outwardly of said series to provide handles.

5. The device of claim 2, an upper corner of each of at least three of said plates being bent inwardly.

ANGUS H. McGREGOR.

REFERENCES CITED

The following references are of record in the file of this patent:

UNITED STATES PATENTS

| Number | Name | Date |
| --- | --- | --- |
| 733,404 | La Veine | July 14, 1903 |
| 835,715 | Sesseli | Nov. 13, 1906 |
| 927,300 | Wahl | July 6, 1909 |
| 1,425,075 | Cady | Aug. 8, 1922 |
| 1,629,207 | Drummond | May 17, 1927 |
| 2,065,875 | Sargent | Dec. 29, 1936 |

FOREIGN PATENTS

| Number | Country | Date |
| --- | --- | --- |
| 6,809 | Great Britain | of 1902 |
| 95,625 | Switzerland | Aug. 1, 1922 |
| 244,580 | Great Britain | Dec. 24, 1925 |
| 319,863 | Germany | Apr. 1, 1920 |